United States Patent [19]

Carducci

[11] Patent Number: 4,707,876
[45] Date of Patent: Nov. 24, 1987

[54] WINDSCREEN WIPER FOR MOTOR VEHICLES

[75] Inventor: Carlo Carducci, Rome, Italy

[73] Assignee: Magneti Marelli S.p.A., Milan, Italy

[21] Appl. No.: 889,067

[22] Filed: Jul. 24, 1986

[30] Foreign Application Priority Data

Jul. 24, 1985 [IT] Italy .................. 48406 A/85

[51] Int. Cl.$^4$ ............................ B60S 1/24; B60S 1/32
[52] U.S. Cl. ................................................ 15/250.23
[58] Field of Search .......... 15/250.21, 250.23, 250.13, 15/250.34, 250.35

[56] References Cited

U.S. PATENT DOCUMENTS 1,134,861 4/1915 Johnson .................. 15/250.21
4,122,578 10/1978 Pretty ................... 15/250.23

FOREIGN PATENT DOCUMENTS 1105743 4/1961 Fed. Rep. of Germany ... 15/250.21
1011618 4/1952 France ...................... 15/250.23

Primary Examiner—Peter Feldman
Attorney, Agent, or Firm—Sughrue, Mion, Zinn, Macpeak, and Seas

[57] ABSTRACT

Motor vehicle windscreen wiper comprising a wiper arm driven by a motor driven operating shaft through a transmission device including a lever having one end coupled for rotation with the operating shaft and its opposite end articulated to the wiper arm, and a rocker link pivotally connected to the lever and articulated at its respective ends about an eccentric pin fixed relative to the operating shaft and to the wiper shaft. The transmission device enables the wiping angle covered by the arm to be increased and, in the case of a single arm windscreen wiper, the positioning of this arm horizontally within the limits of the field of wiping.

5 Claims, 4 Drawing Figures

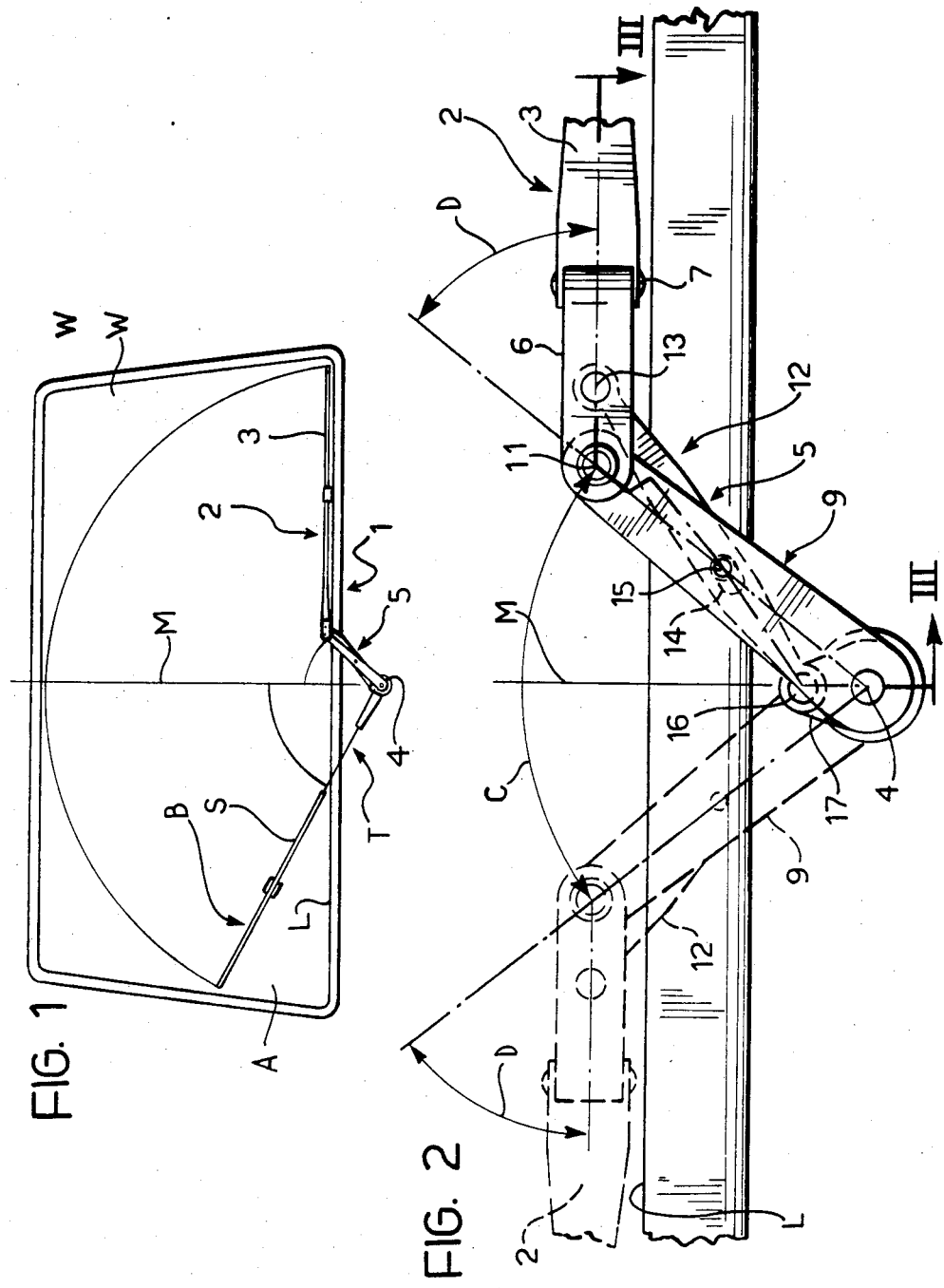

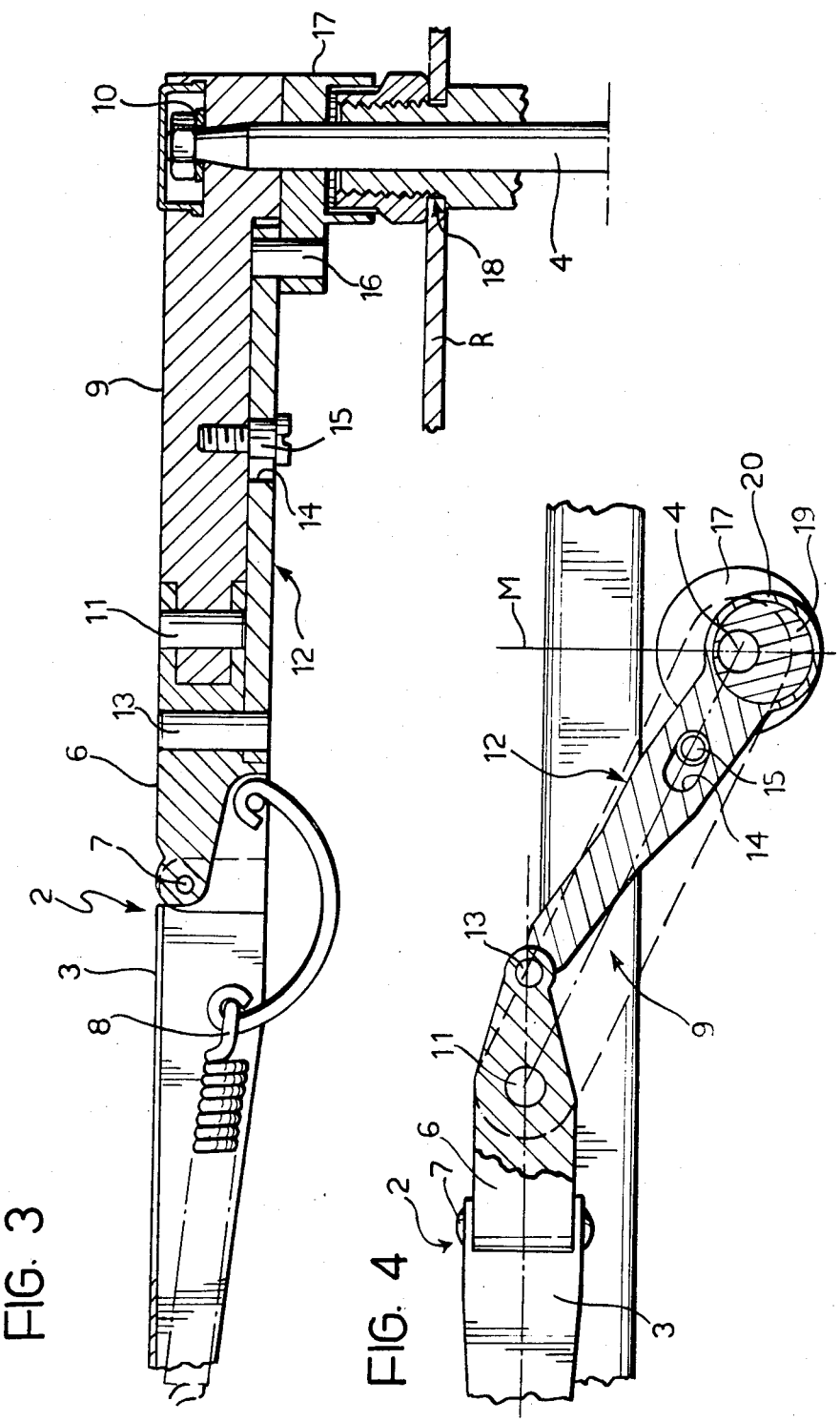

WINDSCREEN WIPER FOR MOTOR VEHICLES

The present invention relates to windscreen wipers for motor vehicles, of the type comprising a motor-driven operating shaft and a wiper arm driven by the operating shaft and carrying a wiper blade.

Known windscreen wipers of this type generally have the disadvantage that the wiping field covered by the wiper arm is limited to a sector of a circle having an angular extent which is usually much less than 180°. This disadvantage is particularly marked in the case of single-arm windscreen wipers, that is, with a single wiper-carrying arm the operating shaft of which is located in the middle of the glass surface (windscreen or rear window) of the vehicle, in that the single arm forms an angle with the lower base of the surface to be wiped at the ends of the wiping sector. Thus, two lower unwiped sectors remain on the surface, with harmful effects on the visibility and hence the driving safety.

In addition to the limitation on the field of action of the blade of the wiper arm, there is another disadvantage relating to the bulk of the latter in the inactive position of the windscreen wiper, with further harmful effects both on the visibility and from the aerodynamic and aesthetic aspect.

The object of the present invention is to avoid these disadvantages and to provide a motor vehicle windscreen wiper of the type specified above, which enables the field of action of the wiper arm to be increased to a circular sector substantially equal to 180°, the wiper arm being brought to a horizontal position or parallel to the base of the surface to be wiped at the extreme limits of its angular movement.

According to the invention, this object is achieved by virtue of the fact that a transmission device is interposed between the wiper arm and the operating shaft and includes a lever having one end coupled for rotation to the operating shaft and its opposite end articulated to the wiper arm, and a rocker link pivotally connected to the lever and articulated at its respective ends about an eccentric pin which is fixed relative to the operating shaft, and to the wiper arm close to the articulation between the latter and the lever.

By virtue of this characteristic it is possible to obtain, for the same rotational movement of the operating shaft, a greater field of wiping than that which can be obtained with conventional windscreen wipers, in that the transmission device of the windscreen wiper of the invention gives the arm an additional angular wiping movement over the lower side zones of the surface to be wiped. With this transmission device the wiper arm is disposed in a horizontal position, that is, parallel to the base of the surface to be wiped, at the end of the rotation of the operating shaft in one sense or in the opposite sense, which is advantageous in terms of aesthetics, improved visibility, and reduced aerodynamic resistance during movement of the vehicle. In fact, the horizontal position taken up by the wiper arm at the limit of the wiping area in the inoperative condition of the windscreen wiper enables the wiper arm to be hidden easily within a seat in the body of the vehicle, for example, behind and beneath the cover of the engine compartment in the case of a windscreen wiper for the windscreen.

As will become apparent from the following description, the transmission device for the windscreen wiper of the invention has an extremely simple structure which can thus be made and assembled easily and cheaply.

The invention will now be described in detail with reference to the appended drawings, provided purely by way of non-limiting example, in which:

FIG. 1 is a schematic front elevational view showing a motor vehicle windscreen provided with a windscreen wiper according to the invention and compared with a conventional windscreen wiper, FIG. 2 is a view of a part of the windscreen wiper of the invention illustrated in FIG. 1, on an enlarged scale, FIG. 3 is a sectional view taken on the line III—III of FIG. 2, and FIG. 4 is a variant of FIG. 2.

FIG. 1 shows schematically a front windscreen W of a motor vehicle provided with a windscreen wiper of the single-arm type. The right-hand part of FIG. 1 with respect to the vertical median line M of the windscreen W shows a windscreen wiper according to the invention, generally indicated 1, while the left-hand part of the same Figure shows a windscreen wiper T of conventional type. Both the windscreen wipers comprise a wiper arm 2,B carrying in known manner a wiper blade 3,S, normally having a wiper element of elastomeric material, and a motor-driven operating shaft 4 for driving the respective wiper arm 2,B. The shaft 4 is rotated in known manner by means of an electric motor, not illustrated, so as to reciprocate the wiper arm 2,B angularly and enable the wiper blade 3,S to wipe a circular sector of the surface of the windscreen W.

As shown in the left-hand part of FIG. 1, the sector of the windscreen W wiped by the wiper arm B of the conventional windscreen wiper T (which is connected directly to the operating shaft 4) has, starting from the median line M, an angular extent which is considerably less than 90°: in other words, the entire angular extent of the circular sector wiped by the conventional windscreen wiper T is considerably less than 180°, whereby an unwiped zone A remains between the base L of the windscreen W and the wiper arm B in each of the two positions taken up by this arm B at each reversal of movement during operation.

By virtue of the device described below, however, this does not occur with the windscreen wiper 1 of the invention because, in each of the two positions of reversal of its movement, the wiper arm 2 lies horizontally adjacent the base L of the windscreen W so that the field of the circular sector wiped during operation has an extent of practically 180°.

Referring now in greater detail to FIGS. 2 and 3, the above-described effect of the windscreen wiper 1 of the invention is achieved by virtue of the fact that the wiper arm 2, instead of being connected directly to the operating shaft 4 as in the case of the conventional windscreen wiper T, is driven by the shaft 4 through a transmission device, generally indicated 5, connected to an end member 6 of the arm 2 to which the wiper blade 3 is articulated in known manner about a transverse pin 7. It is well known that this articulation allows the blade 3 to rotate and hence move away from the windscreen W against the action of a return spring 8 to allow the manual cleaning of the windscreen W or the replacement of the wiper element.

The transmission device 5 comprises a lever 9 having one end coupled for rotation at 10 to the operating shaft 4 and its opposite end articulated to the free end of the end member 6 of the wiper arm 2 about a transverse pin 11 parallel to the shaft 4.

The transmission device 5 further includes a rocker link 12 articulated at one end to the end member 6 about a transverse pin 13 adjacent the pin 11 and displaced relative thereto towards the wiper blade 3, and having a central longitudinal slot 14 in which a roller pin 15 projecting from the lever 9 parallel to the pins 11 and 13 is engaged with clearance.

The other end of the rocker link 12 is articulated about a pin 16, also parallel to the pins 11 and 13, which is fixed and eccentric relative to the shaft 4. This pin 16 is in fact carried by a support 17 through which the shaft 4 passes and which is fixed by a bush attachment unit, generally indicated 18, to the structure R of the vehicle beneath the base L of the windscreen W.

As shown in FIG. 1, the axes of the operating shaft 4 and the fixed pin 16 are aligned in a plane passing through the middle M of the windscreen W, and the pin 16 is displaced relative to the shaft 4 towards the base L of the windscreen W.

During operation of the windscreen wiper 1, the rotation of the drive shaft 4 effects the angular reciprocating movement of the lever 9 and hence of the wiper arm 2 on opposite sides of the median line M of the windscreen W through an angular extent indicated C in FIG. 2. By virtue of the presence of the rocker link 12, the wiper arm 2 covers a supplementary sector of extent D from each end position of the lever 9, so as to be disposed horizontally adjacent the base L of the windscreen W on one side and the other. Thus, the wiper arm 2 wipes a circular sector of the windscreen wiper W having an extent of 180° with clear advantages compared with known windscreen wipers.

The variant of FIG. 4 is generally similar to the embodiment described above and only the differences will be described in detail with the use of the same reference numerals for identical or similar parts.

In this variant, the fixed pin of the rocker link 12 is constituted by a bush 19 through which the operating shaft 4 passes eccentrically and which is rotatably surrounded by an annular end part 20 of the link 12. In this case, the positions of the axes of rotation of the shaft 4 and the fixed pin 19 are reversed relative to the previous case, that is, it is the shaft 4 which is displaced towards the base L of the windscreen W. Consequently, the arrangement of the respective articulation pins 11 and 13 of the lever 9 and the link 12 on the end member 6 of the wiper arm 2 is also reversed compared with the previous case, that is, the pin 11 is displaced towards the wiper blade 3 relative to the pin 13.

Naturally, although the invention has been described with reference to a single-arm windscreen wiper, it is clear that it can also be applied to windscreen wipers with two or more wiper arms.

I claim:

1. Windscreen wiper for motor vehicles, comprising a motor driven operation shaft, a wiper arm driven by the operating shaft and a wiper blade carried by the wiper arm, wherein a transmission device is interposed between the wiper arm and the operating shaft and includes a lever having one end coupled for rotation to the operating shaft and the opposite end thereof articulated to the wiper arm, an eccentric pin fixed relative to the operating shaft, and a rocker link pivotably connected to the lever and articulated at the respective ends thereof about the eccentric pin and to the wiper arm close to the articulation between the latter and the lever.

2. Windscreen wiper according to claim 1 wherein the lever carries a transverse pivot pin and the rocker link defines a longitudinal slot in which the pivot pin is engaged with clearance.

3. Windscreen wiper according to claim 1 wherein a bush is fixed coaxially relative to the operating shaft and carries the eccentric fixed pin, and wherein the wiper arm carries a first articulation pin for the lever and a second articulation pin for the rocker link, the second pin being displaced towards the wiper blade relative to the first pin.

4. Windscreen wiper according to claim 1 wherein a fixed bush eccentrically surrounds the operating shaft and constitutes the eccentric fixed pin, wherein the rocker link has an annular end portion rotatably engaged on the bush, and wherein the wiper arm carries a first articulation pin for the lever and a second articulation pin for the rocker link, the second pin being displaced away from the wiper blade relative to the first pin.

5. Windscreen wiper according to claim 1 wherein the wiper is of the single arm type and wherein the axis of the operating shaft and the axis of the eccentric fixed pin are contained in a plane bisecting the wiping angle covered by the wiper arm.

* * * * *